United States Patent
Long

(10) Patent No.: US 8,511,199 B2
(45) Date of Patent: Aug. 20, 2013

(54) ROBOT ARM ASSEMBLY

(75) Inventor: Bo Long, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 180 days.

(21) Appl. No.: 12/975,604

(22) Filed: Dec. 22, 2010

(65) Prior Publication Data

US 2011/0265597 A1 Nov. 3, 2011

(30) Foreign Application Priority Data

Apr. 29, 2010 (CN) .......................... 2010 1 0160141

(51) Int. Cl.
*B25J 17/00* (2006.01)
(52) U.S. Cl.
USPC .............................. 74/490.05; 901/14; 901/15
(58) Field of Classification Search
USPC ....................................................... 74/490.05
See application file for complete search history.

(56) References Cited

U.S. PATENT DOCUMENTS

| | | | | |
|---|---|---|---|---|
| 3,922,930 A * | 12/1975 | Fletcher et al. | ............. | 74/665 B |
| 5,456,132 A * | 10/1995 | Iwanaga et al. | ............ | 74/490.06 |
| 5,459,925 A * | 10/1995 | Akeel et al. | .................. | 29/893.2 |
| 5,575,179 A * | 11/1996 | Arbrink | ...................... | 74/490.03 |
| 5,934,148 A * | 8/1999 | Haniya et al. | .............. | 74/490.06 |
| 7,734,375 B2 * | 6/2010 | Buehler et al. | ................ | 700/245 |
| 8,156,840 B2 * | 4/2012 | Tange | ........................ | 74/490.03 |
| 8,176,808 B2 * | 5/2012 | Fisk et al. | .................. | 74/490.05 |
| 8,210,069 B2 * | 7/2012 | Chen et al. | ................. | 74/490.06 |
| 2005/0016313 A1* | 1/2005 | Robertson et al. | ......... | 74/490.01 |
| 2005/0115351 A1* | 6/2005 | Kimata et al. | ............. | 74/490.01 |
| 2005/0204850 A1* | 9/2005 | Nihei et al. | ................ | 74/490.01 |
| 2006/0213307 A1* | 9/2006 | Haga et al. | ................. | 74/490.01 |
| 2009/0114054 A1* | 5/2009 | Horiuchi et al. | ........... | 74/490.05 |
| 2009/0312870 A1* | 12/2009 | Okuda et al. | .................. | 700/258 |
| 2011/0067517 A1* | 3/2011 | Ihrke et al. | ................. | 74/490.03 |
| 2011/0120252 A1* | 5/2011 | Liu et al. | .................... | 74/490.01 |
| 2011/0154935 A1* | 6/2011 | Liu | ............. | 74/490.04 |
| 2011/0154938 A1* | 6/2011 | Liu et al. | .................... | 74/490.05 |

* cited by examiner

*Primary Examiner* — Troy Chambers
*Assistant Examiner* — Zakaria Elahmadi
(74) *Attorney, Agent, or Firm* — Altis Law Group, Inc.

(57) ABSTRACT

A robot arm assembly includes a support arm, a connecting arm, and an end arm. The support arm is rotatably assembled with the connecting arm along a first axis, and is located at one end of the connecting arm. The end arm is rotatably assembled to the other end of the connecting arm along a second axis substantially perpendicular to the first axis, such that the connecting arm is rotatably assembled between the support arm and the end arm.

9 Claims, 2 Drawing Sheets

ROBOT ARM ASSEMBLY

BACKGROUND

1. Technical Field

The present disclosure relates to robotics, and particularly, to a robot arm assembly applied to a mechanical robot.

2. Description of Related Art

Industrial robots are widely applied in many fields such as industrial manufacturing, repair, checking, and the like, to replace manual labor. A commonly used robot generally includes a base, a plurality of mechanical arms, and a driving assembly. The mechanical arms are connected to each other in turn and are respectively driven by the driving assembly to rotate along respective corresponding rotating axes. However, the positioning accuracy of commonly used mechanical arm assemblies is often limited.

Therefore, there is room for improvement in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the robot arm assembly. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
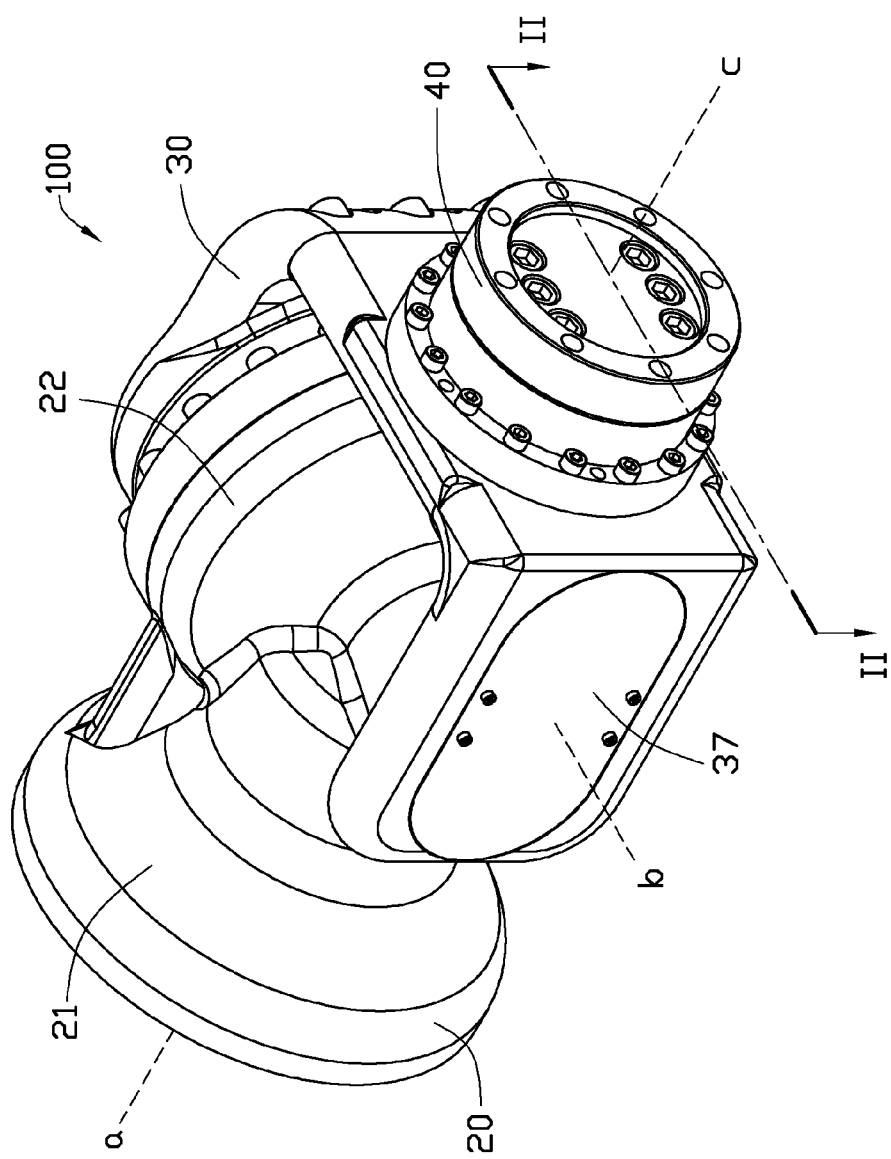
FIG. 1 is an assembled isometric view of an embodiment of a robot arm assembly.
Figure 2:
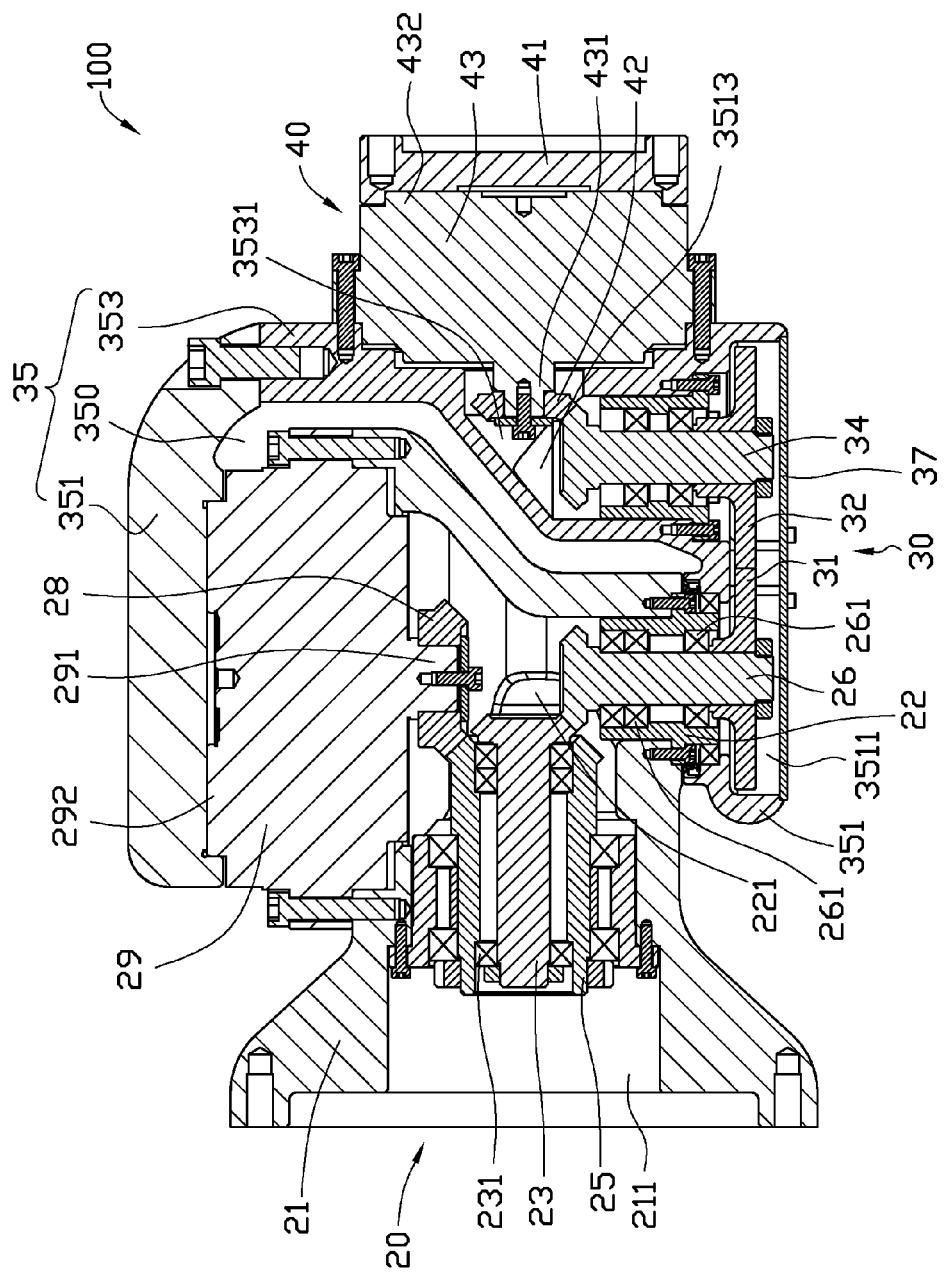
FIG. 2 is a cross-section taken along line II-II of FIG. 1.

Referring to FIGS. 1 and 2, an embodiment of a robot arm assembly 100 includes a support arm 20, a connecting arm 30, and an end arm 40. The support arm 20 and the end arm 40 are both rotatably assembled with the connecting arm 30, and respectively located at two opposite ends of the connecting arm 30, such that the connecting arm 30 is rotatably assembled between the support arm 20 and the end arm 40. In the illustrated embodiment, the robot arm assembly 100 is applied to a six-axis robot (not shown), such that the support arm 20, the connecting arm 30 and the end arm 40 are respectively configured to rotate along a first axis a, a second axis b, and a third axis c of the six-axis robot. The first axis a and the third axis c are substantially coaxial and substantially perpendicular to the second axis b.

The support arm 20 is substantially T-shaped, and includes a main body 21, a rotary connecting portion 22, a first gear 23, a second gear 25, a third gear 26, a fourth gear 28, and a first reducer 29. The main body 21 is a substantially hollow stepped shaft defining a first assembly shaft hole 211. The rotary connecting portion 22 is also a substantially hollow stepped shaft formed at one end of the main body 21 cross jointed with the main body 21. The rotary connecting portion 22 defines a second assembly shaft hole 221 substantially perpendicular to and cross jointed with the first assembly shaft hole 211 of the main body 21.

The first gear and second gears 23, 25 are both bevel gears in the illustrated embodiment, and are both rotatably assembled within the first assembly shaft hole 211 of the main body 21. The second gear 25 is substantially hollow and sleeves on the first gear 23. The first gear 23 is rotatably assembled within the second gear 25 via two first bearings 231 and is coaxial with the second gear 25. The two first bearings 231 respectively sleeve on two ends of the first gear 23.

The third gear 26 is a bevel gear in the illustrated embodiment. The third gear 26 is rotatably assembled within one end of the second assembly shaft hole 221 via two second bearings 261 and is positioned at one side of the main body 21. One end of the third gear 26 rotatably engages with the first gear 23 and the opposite other end of the third gear 26 is exposed to outer side of the rotary connecting portion 22 hinging on the connecting arm 30.

The fourth gear 28 is also a bevel gear in the illustrated embodiment. The fourth gear 28 is rotatably assembled within the opposite other end of the second assembly shaft hole 221 and is coaxially positioned at the opposite other side of the main body 21 relative to the third gear 26. The fourth gear 28 rotatably engages the second gear 25.

The first reducer 29 is a cycloidal pinwheel reducer in the illustrated embodiment. The first reducer 29 is assembled to the other end of the second assembly shaft hole 221 of the rotary connecting portion 22 together with the fourth gear 28. The first reducer 29 includes an input shaft 291 and an opposite output shaft 292. The input shaft 291 is fixed with the fourth gear 28. The opposite output shaft 292 of the first reducer 29 is securely assembled with the connecting arm 30, such that the connecting arm 30 assembled with the support arm 20 is rotatable along the axis b (shown in FIG. 1).

The connecting arm 30 includes a connecting body 35, a fifth gear 31, a sixth gear 32, a seventh gear 34, and a shielding cover 37. The connecting body 35 is substantially U-shaped, and includes two substantially parallel side plates 351 and a bottom plate 353. The bottom plate 353 connects with the two side plates 351 and is positioned between the two side plates 351. The two side plates 351 and the bottom plate 353 cooperatively form a receiving space 350. In the illustrated embodiment, the rotary connecting portion 22 of the support arm 20 together with the third gear 26 and the first reducer 29 is received within the receiving space 350.

A mounting slot 3511 is recessed from an outer surface of one side plate 351 away from the receiving space 350. One end of the mounting slot 3155 away from the bottom plate 353 defines a first mounting hole (not labeled) communicating with the receiving space 350, corresponding to the second assembly shaft hole 221 of the support arm 20. In assembly, the opposite other end of the third gear 26 together with rotary connecting portion 22 of the support arm 20 is rotatably assembled to the first mounting hole of the side plate 351, and the output shaft 292 is rotatably assembled to the other side plate 351. A second mounting hole 3513 is separately defined in the bottom of the mounting slot 3511, adjacent to the bottom plate 353 side. The second mounting hole 3513 is substantially parallel to the first mounting hole and extends from the bottom of the mounting slot 3155 to a middle portion of the bottom plate 353. A stepped third mounting hole 3531 is defined in the middle portion of the bottom plate 353 and crosses the distal end of the second mounting hole 3513.

The fifth gear 31 and the sixth gear 32 are both cylindrical gears as illustrated. The fifth gear 31 is fixed to the distal end of the third gear 26 and is rotatably accommodated within the mounting slot 3511 of the side plate 351. The sixth gear 32 is rotatably accommodated within the mounting slot 3511 and rotatably engages the fifth gear 31. The seventh gear 34 is a bevel gear rotatably assembled within the second mounting hole 3513. One end of the seventh gear 34 passes through the second mounting hole 3513 and is fixed with the sixth gear 32, the opposite other end of the seventh gear 34 is located at the junction of the second mounting hole 3513 and the third mounting hole 3531, engaging the end arm 40. The shielding cover 37 is a substantially rectangular plate and is detachably covered on the mounting slot 3511 of the side plate 351.

The end arm 40 is rotatably assembled with the connecting arm 30, and includes an output flange 41, a transmission gear 42 and a second reducer 43. The transmission gear 42 is a bevel gear in the illustrated embodiment. The transmission gear 42 is assembled within the third mounting hole 3531 of the connecting body 35 and rotatably engages the corresponding seventh gear 34. The second reducer 43 is a cycloidal pinwheel reducer in the illustrated embodiment, and includes an input shaft 431 and an opposite output shaft 432. The second reducer 43 is assembled to the bottom plate 353 of the connecting body 35. The input shaft 431 of the second reducer 43 is fixed with the transmission gear 42. The output flange 41 is fixed to the output shaft 432 of the second reducer 43 such that the output flange 41 is rotatably assembled with the connecting arm 30 via the transmission gear 42 and the second reducer 43 along the axis c (shown in FIG. 1).

In use, the first gear 23 and the second gear 25 of the support arm 20 are respectively driven by a driver (not shown) to rotate along the axis a. When the first gear 23 is rotated along the axis a, the third gear 26 engaging the first gear 23 is rotated together with the fifth gear 31 mounted on the distal end of the third gear 26. The sixth gear 32 together with the seventh gear 34 is rotated, and the transmission gear 42 is rotated along the axis c together with the second reducer 43 and the output flange 41. As the second gear 25 is rotated by the driver, the fourth gear 28 engaging the second gear 25 is rotated such that the connecting arm 30 is rotated along the axis b relative to the support arm 20.

It is to be understood, however, that even through numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A robot arm assembly, comprising:
    a connecting arm comprising a substantially U-shaped connecting body, wherein the connecting body comprises two substantially parallel side plates and a bottom plate connected with the two side plates, and the two side plates and the bottom plate cooperatively define a receiving space;
    a support arm located at one end of the connecting body of the connecting arm, the support arm comprising:
    a main body, a rotary connecting portion cross jointed with the main body, a first gear, a second gear, a third gear, a fourth gear, and a first reducer assembled within the rotary connecting portion, wherein the rotary connecting portion is received in the receiving space of the connecting body, the first gear and the second gear are rotatably assembled within the main body, the third and fourth gears are respectively assembled within two ends of the rotary connecting portion and respectively engaged with the first and second gears, the first reducer comprises an input shaft and an output shaft, the input shaft is fixed with the fourth gear, and the output shaft is securely connected with an inner wall of one of the two side plates of the connecting arm, such that the connecting arm is rotatable along a first axis relative to the support arm, and the one of the two side plates covers the output shaft; and
    an end arm rotatably assembled to another end of the connecting body of the connecting arm along a second axis substantially perpendicular to the first axis relative to the end arm.

2. The robot arm assembly of claim 1, wherein the main body defines a first assembly shaft hole, the rotary connecting portion defines a second assembly shaft hole substantially perpendicular to and cross-jointed with the first assembly shaft hole; the first and second gears are assembled within the first assembly shaft hole, and the second gear is substantially hollow shaped and rotatably sleeves on the first gear.

3. The robot arm assembly of claim 2, wherein the support arm further comprises two first bearings; the first, second, third, and fourth gears are bevel gears, and the first gear is rotatably assembled within the second gear via the two first bearings and is substantially coaxial with the second gear.

4. The robot arm assembly of claim 3, wherein the third gear is rotatably assembled within one end of the second assembly shaft hole via two second bearings, the fourth gear is rotatably assembled within the opposite other end of the second assembly shaft hole and is coaxial with the third gear.

5. The robot arm assembly of claim 2, wherein the first reducer is assembled within the second assembly shaft hole together with the fourth gear.

6. The robot arm assembly of claim 5, wherein the first reducer is a cycloidal pinwheel reducer.

7. The robot arm assembly of claim 1, wherein a first mounting hole and a second mounting hole are separately defined in one side plate; the first mounting hole communicates with the receiving space; the second mounting hole is positioned adjacent to the bottom plate; the bottom plate defines a third mounting hole crosses the second mounting hole; the connecting arm further comprises a fifth gear, a sixth gear, and a seventh gear; the fifth gear is rotatably assembled to the first mounting hole and fixed with third gear; the sixth gear is assembled to the second mounting hole and engages the fifth gear; the seventh gear is fixed with the sixth gear and received within the second mounting hole; the end arm is rotatably assembled within the third mounting hole and is driven by the seventh gear to rotate.

8. The robot arm assembly of claim 7, wherein the end arm comprises a transmission gear and an output flange fixed to the transmission gear; the transmission gear is a bevel gear assembled within the third mounting hole and rotatably engages the corresponding seventh gear.

9. The robot arm assembly of claim 8, the end arm further comprises a second reducer assembled between the transmission gear and the output flange, the second reducer comprises an input shaft and an opposite output shaft, the input shaft is fixed with the transmission gear, and the output shaft is fixed to the output flange such that the output flange is rotatably assembled with the connecting arm via the transmission gear and the second reducer.

* * * * *